(12) United States Patent
Shimizu et al.

(10) Patent No.: US 10,249,979 B2
(45) Date of Patent: Apr. 2, 2019

(54) WATERPROOF COMPONENT WITH WIRING STRUCTURE

(71) Applicant: Yazaki Corporation, Tokyo (JP)

(72) Inventors: Isanori Shimizu, Shizuoka (JP);
Kouichi Ohyama, Shizuoka (JP);
Takeo Koga, Shizuoka (JP); Kazunori Miura, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/923,309

(22) Filed: Mar. 16, 2018

(65) Prior Publication Data

US 2018/0277983 A1 Sep. 27, 2018

(30) Foreign Application Priority Data

Mar. 27, 2017 (JP) .................................. 2017-061087

(51) Int. Cl.
| | |
|---|---|
| *H01R 13/73* | (2006.01) |
| *H01R 13/52* | (2006.01) |
| *H01R 13/516* | (2006.01) |
| *H01R 13/74* | (2006.01) |

(Continued)

(52) U.S. Cl.
CPC ..... *H01R 13/5208* (2013.01); *B60R 16/0222* (2013.01); *H01R 13/516* (2013.01);
(Continued)

(58) Field of Classification Search
CPC .... H01R 23/27; H01R 13/74; H01R 33/7642; H01R 13/743; H01R 33/00;
(Continued)

(56) References Cited

U.S. PATENT DOCUMENTS 4,492,421 A * 1/1985 Ito .......................... H01B 17/30
439/271
5,278,357 A * 1/1994 Yamanashi ............. F16H 57/04
174/151

(Continued)

FOREIGN PATENT DOCUMENTS

JP 2010-192396 A 9/2010

*Primary Examiner* — Thanh Tam T Le
(74) *Attorney, Agent, or Firm* — Sughrue Mion, PLLC

(57) ABSTRACT

A waterproof component includes a housing body, a mat seal, mat seal cover, and an elastic ring. The housing body includes an attachment-hole-insertion portion having a mat-seal-accommodating chamber, an abutting portion to abut a first peripheral surface of the attachment hole, a locking claw provided on an insertion tip side of the attachment hole insertion portion, the locking claw to be locked to a second peripheral surface of the attachment hole, and a cover locking portion provided on an insertion tip side of the attachment-hole-insertion portion. The mat seal has an electric wire press-fitting hole. The mat-seal-accommodating chamber accommodates the mat seal. The mat seal cover locks to the cover-locking portion, the mat seal cover interposes the mat seal between the mat seal cover and a bottom wall of the mat-seal-accommodating chamber. The elastic ring is disposed on an outer periphery of the attachment-hole-insertion portion.

2 Claims, 6 Drawing Sheets

(51) Int. Cl.
*H02G 3/22* (2006.01)
*B60R 16/02* (2006.01)

(52) U.S. Cl.
CPC ....... *H01R 13/521* (2013.01); *H01R 13/5202* (2013.01); *H01R 13/5213* (2013.01); *H01R 13/743* (2013.01); *H02G 3/22* (2013.01)

(58) Field of Classification Search
CPC .............. H01R 13/5202; H01R 13/748; H01R 13/745; H02G 15/013; H02G 3/22
USPC ....... 439/284, 544, 553–557, 559, 564, 565; 174/77 R, 151
See application file for complete search history.

(56) References Cited

U.S. PATENT DOCUMENTS

| | | | | |
|---|---|---|---|---|
| 5,631,445 | A * | 5/1997 | Herster | B60R 16/0222 174/151 |
| 5,890,922 | A * | 4/1999 | Buchter | H01R 13/504 439/284 |
| 6,860,759 | B2 * | 3/2005 | Nakamura | H01R 13/745 439/557 |
| 7,090,533 | B1 * | 8/2006 | Houck | H01R 13/743 439/546 |
| 7,318,748 | B2 * | 1/2008 | Yamakado | H01R 13/743 439/552 |
| 9,017,099 | B2 * | 4/2015 | Ikeda | H01R 25/162 439/559 |
| 9,484,647 | B2 * | 11/2016 | Ishikawa | H01R 13/502 |
| 2011/0300731 | A1 | 12/2011 | Nakamura | |

\* cited by examiner

WATERPROOF COMPONENT WITH WIRING STRUCTURE

CROSS REFERENCE TO RELATED APPLICATIONS

This application claims the priority of Japanese Patent Application No. 2017-061087, filed on Mar. 27, 2017, the entire content of which are incorporated herein by reference.

BACKGROUND

Technical Field

The present invention relates to a waterproof component for preventing water from entering various devices in which electric wires are routed over a wet area and a waterproof area.

Related Art

When electric wires are routed over a wet area and a waterproof area, such as a control device disposed in an engine room of an automobile, waterproof components attached to the electric wires prevent water from entering various devices where the electric wires are routed.

Techniques related to such a waterproof component are proposed in JP 2010-192396 A.

SUMMARY

The present invention is made in view of the above-described problems, and has an object to provide a waterproof component that can be easily attached only with a pushing work into attachment holes of a wall portion of a target device, thereby improving the efficiency of attachment work.

A waterproof component according to an aspect of the present invention is configured to insert an electric wire into an attachment hole penetrating a wall portion to lock. The waterproof component includes a housing body, a mat seal, mat seal cover, and an elastic ring. The housing body includes an attachment hole insertion portion configured to be inserted into the attachment hole, a mat seal accommodating chamber having a bottom wall being formed inside the attachment hole insertion portion, an abutting portion configured to abut a first peripheral surface of the attachment hole, a locking claw provided in an elastically deformable manner on an insertion tip side of the attachment hole insertion portion, the locking claw being configured to be locked to a second peripheral surface of the attachment hole opposite to the first peripheral surface, and a cover locking portion provided on an insertion tip side of the attachment hole insertion portion. The mat seal is configured to be accommodated in the mat seal accommodating chamber and has an electric wire press-fitting hole through which an electric wire is to penetrate. The mat seal cover is configured to be locked to the cover locking portion and to interpose the mat seal between the mat seal cover and the bottom wall of the mat seal accommodating chamber to hold the mat seal in the mat seal accommodating chamber. The elastic ring is disposed on an outer periphery of the attachment hole insertion portion and is configured to be in close contact with an inner peripheral surface of the attachment hole when the waterproof component is attached to the attachment hole.

The waterproof component according to the aspect of the present invention provides a waterproof component that can be easily attached only with a pushing work into attachment holes of a wall portion of a target device, thereby improving the efficiency of attachment work.

DETAILED DESCRIPTION

A waterproof component 1 according to an embodiment of the present invention will be described with reference to FIGS. 1 to 6B.

Configuration Example of Waterproof Component

The waterproof component 1 according to the embodiment of the present invention has a configuration as shown in FIGS. 1 to 6B.

Figure 1:
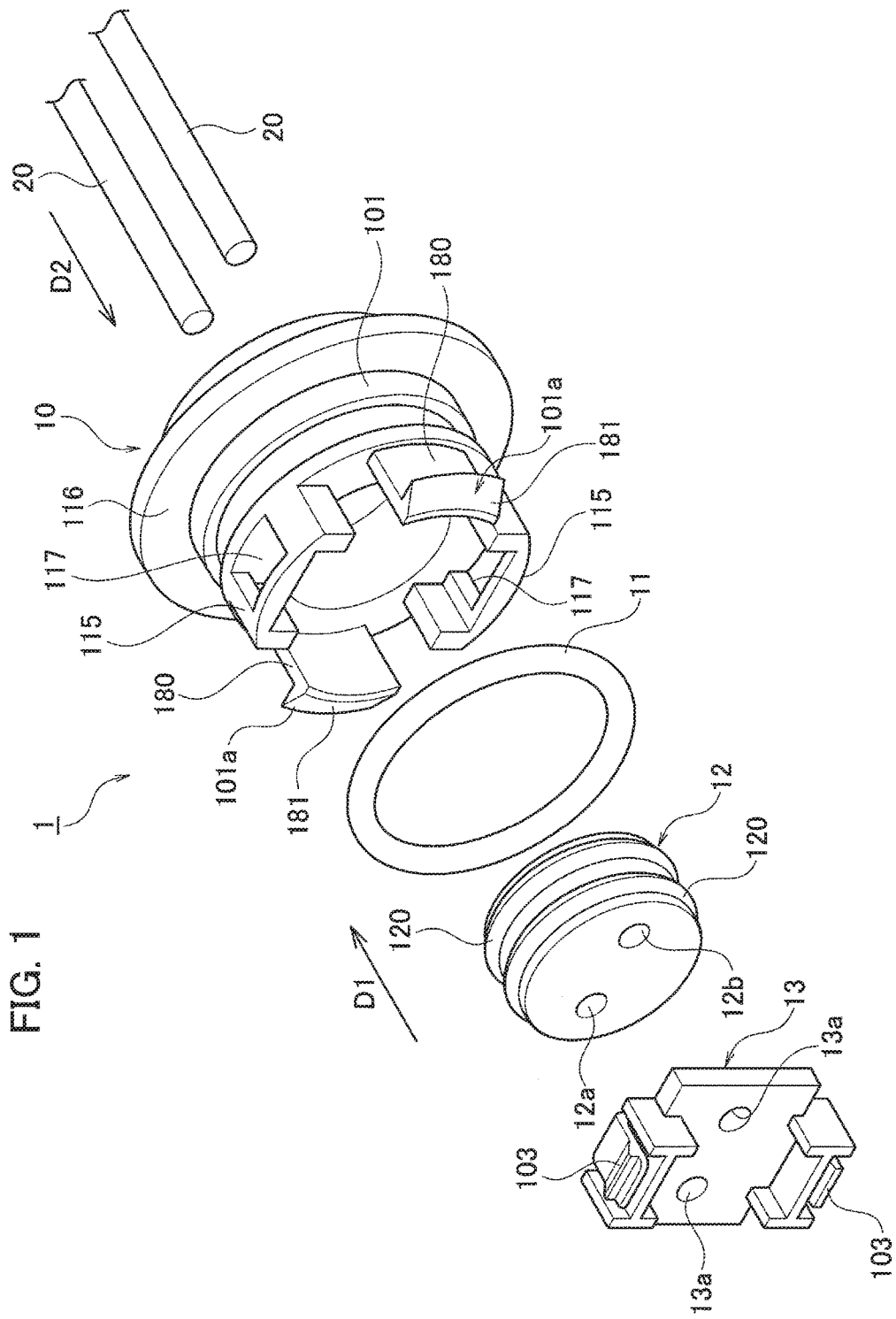
FIG. 1 is an exploded perspective view showing a configuration example of a waterproof component according to an embodiment.
Figure 2:
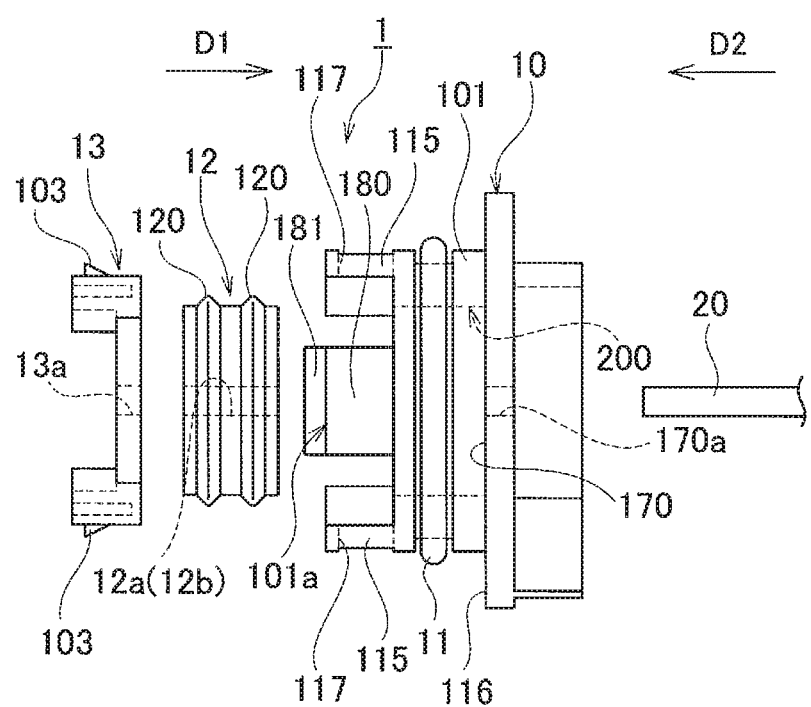
FIG. 2 is an exploded perspective view showing a configuration example of a waterproof component according to the embodiment.
Figure 3:
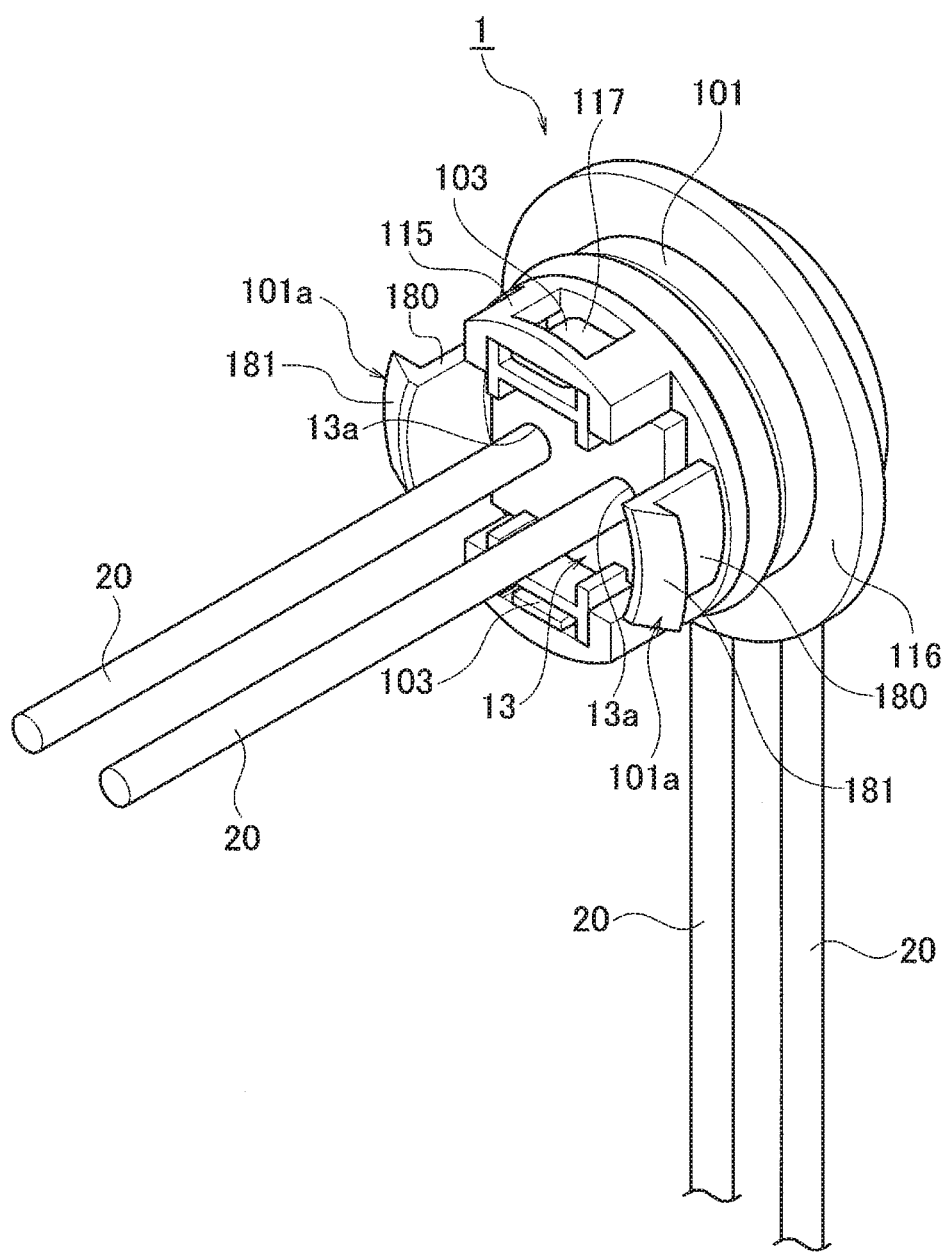
FIG. 3 is a perspective view showing the overall configuration of a waterproof component according to the embodiment.
Figure 4:
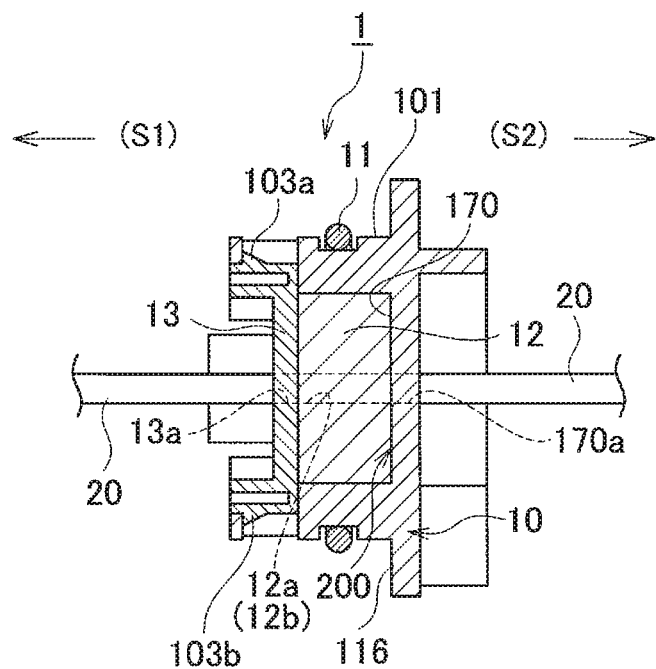
FIG. 4 is a cross-sectional view showing the overall configuration of a waterproof component according to the embodiment.
Figure 5A:
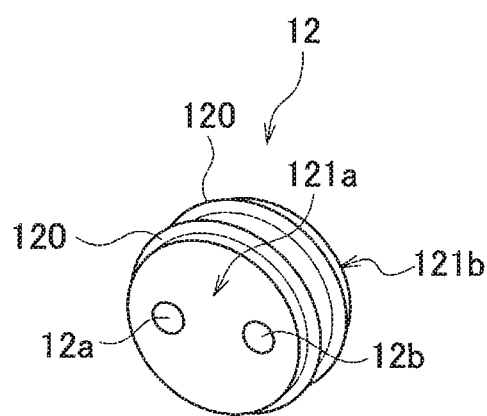
FIG. 5A is an perspective view showing a configuration example of a mat seal of the waterproof component according to the embodiment.
Figure 5B:
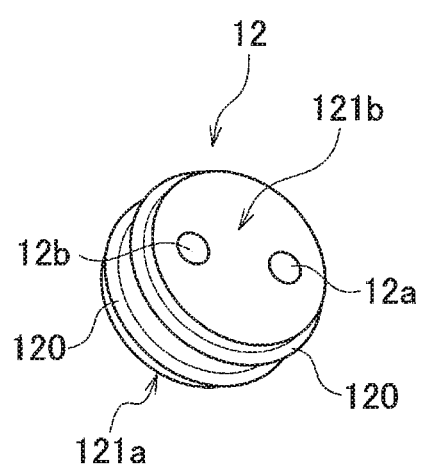
FIG. 5B is an perspective view showing a configuration example of a mat seal of the waterproof component according to the embodiment.

Here, FIG. 1 is an exploded perspective view showing a configuration example of a waterproof component 1 according to an embodiment; FIG. 2 is an exploded perspective view showing a configuration example of a waterproof component 1; FIG. 3 is a perspective view showing the overall configuration of a waterproof component 1; FIG. 4 is a cross-sectional view showing the overall configuration of a waterproof component 1; FIGS. 5A and 5B are perspective view showing a configuration example of a mat seal 12 of the waterproof component 1; and FIGS. 6A and 6B are explanatory diagram showing a process of attaching the waterproof component 1.

Figure 6A:
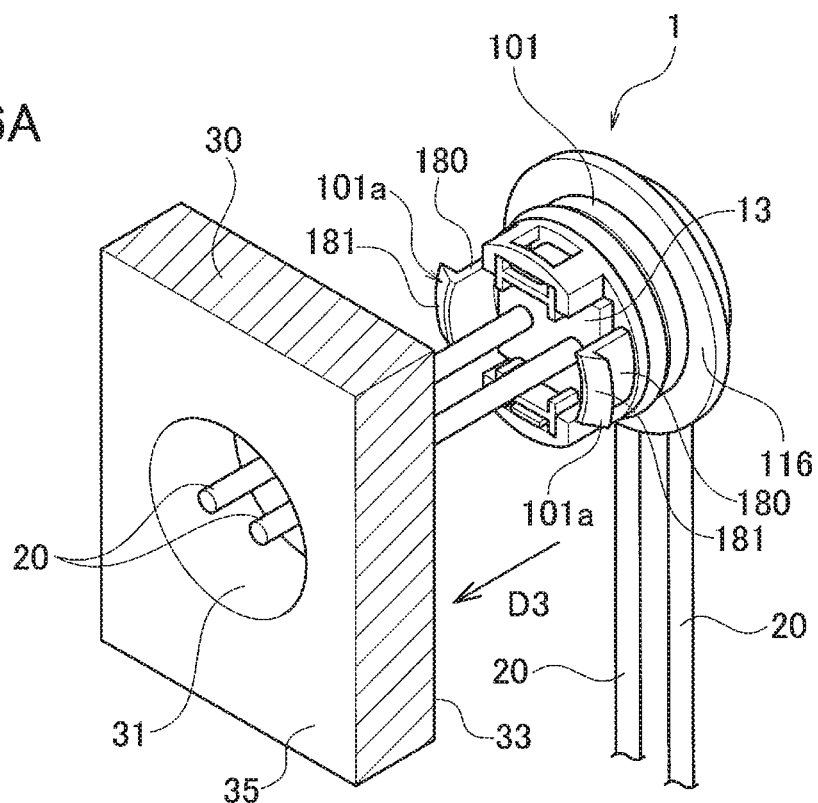
FIG. 6A is an explanatory diagram showing a process of attaching the waterproof component according to the embodiment.
Figure 6B:
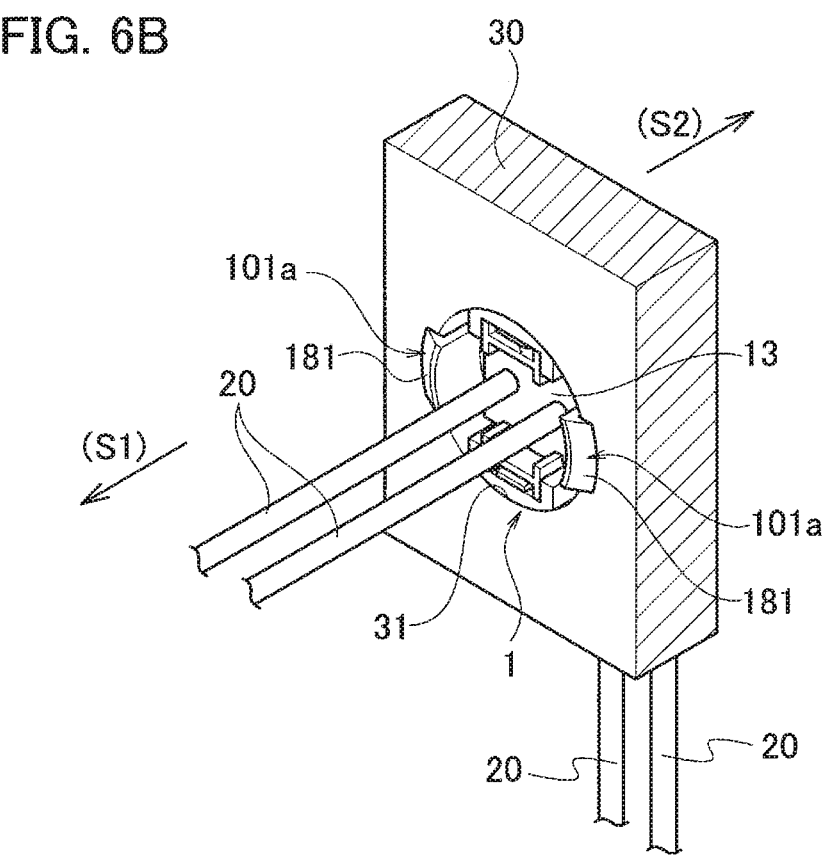
FIG. 6B is an explanatory diagram showing a process of attaching the waterproof component according to the embodiment.

As shown in FIGS. 6A and 6B and the like, a circular attachment hole 31 is formed in a wall portion 30 of a vehicle body panel, a control device, or the like. The attachment hole 31 is penetrated with electric wires 20. The electric wire 20 penetrates through the attachment hole 31, thereby being routed over the wet area on one side of the wall portion 30 and the waterproof area on the other side of the wall portion 30. An ECU and the like are disposed in one wet area (S2), and various sensors and the like are disposed in the other waterproof area (S1).

As shown in FIG. 3 and the like, the electric wires 20 are equipped with the waterproof component 1. The attachment hole 31 of the wall portion 30 is filled with this waterproof component 1 (see FIG. 6B).

As shown in FIGS. 1 to 4, the waterproof component 1 includes a housing body 10, a mat seal 12, a mat seal cover 13, and an elastic ring (O-ring) 11.

The housing body 10 includes an attachment hole insertion portion 101 inserted into the attachment hole 31, an abutting portion (flange portion) 116 provided on the insertion back end side of the attachment hole insertion portion 101, a pair of left and right locking claws 101a in the figure, and a pair of upper and lower cover locking portions 115 in the figure.

The attachment hole insertion portion 101 has substantially the same outer peripheral shape as the attachment hole 31. A mat seal accommodating chamber 200 having a bottom wall 170 is formed inside the attachment hole insertion portion 101.

As shown in FIG. 2, an electric wire insertion holes 170a are formed in the bottom wall 170.

The abutting portion 116 has a larger diameter than the attachment hole 31. The abutting portion 116 abuts on the surface 33 on one side of the wall portion 30 of the attachment hole 31.

The pair of locking claws 101a are disposed in positions facing each other at 180 degrees. Each locking claw 101a includes an elastic support wall 180 and a claw portion 181 provided at the tip of the elastic support wall 180. The tip of each claw portion 181 protrudes outward from the outer peripheral surface of the attachment hole insertion portion 101.

The pair of cover locking portions 115 are disposed in positions facing each other at 180 degrees. The outer peripheral surface of each cover locking portion 115 is flush with the outer peripheral surface of the attachment hole insertion portion 101. An engagement hole 117 is formed in each cover locking portion 115. The engagement hole 117 penetrates the inner peripheral surface and the outer peripheral surface of the cover locking portion 115.

As shown in FIGS. 1 to 5B and the like, the mat seal 12 is made of an elastically deformable material and presents a disc shape. In the mat seal 12, two electric wire press-fitting holes 12a, 12b are formed in point symmetry positions centered on the center point. The electric wire 20 penetrates through each electric wire press-fitting holes 12a, 12b. The gap between the outer peripheral surface of each electric wire 20 and the electric wire press-fitting holes 12a, 12b of the mat seal 12 is waterproofed by compressive deformation of the mat seal 12.

Two lines of protrusions 120 are provided on the outer peripheral surface of the mat seal 12. The mat seal 12 is press-fitted into the mat seal accommodating chamber 200 with the two lines of protrusions 120 compressed and deformed.

As shown in FIG. 1 and the like, the mat seal cover 13 is made of an elastically deformable material. Then, the mat seal cover 13 is provided with a pair of upper and lower locking protrusions 103 in the figure. Each locking protrusion 103 is formed to be elastically deformable in the vertical direction.

The mat seal cover 13 is formed with insertion holes 13a through which the electric wires 20 are inserted. Each insertion hole 13a is formed in a position facing each electric wire press-fitting hole 12a, 12b of the mat seal 12. In each insertion hole 13a, an electric wire 20 penetrating the electric wire press-fitting hole 12a, 12b of the mat seal 12 is inserted through.

Each locking protrusion 103 is fitted into the engagement hole 117 of the housing body 10 from the inside to be locked. Thus, the mat seal 12 is interposed between the mat seal cover 13 and the bottom wall 170 to be held in the mat seal accommodating chamber 200 (see FIG. 4).

It should be noted that the number of the electric wires 20 is optional, and the number of the insertion holes of the mat seal 12 and the mat seal cover 13 is naturally changed in accordance with the number of the electric wires 20.

Here, as shown in FIGS. 5A and 5B, the mat seal 12 is formed so that the front side 121a and the back side 121b have the same shape. Thus, since there is no need to distinguish the front and back sides of the mat seal 12, the efficiency of the work of attaching the housing body 10 to the mat seal accommodating chamber 200 can be further increased.

The wall portion 30 including a vehicle body panel or the like partitions the side where the electric wires 20 are connected via at least one connector to the circuit load side (sensor side S1) and the power supply side of the electric wires 20 (electronic control unit (ECU) side S2). In the waterproof component 1 according to the present embodiment, the mat seal 12 is inserted into the mat seal accommodating chamber 200 of the housing body 10 from the circuit load side (that is, the mat seal 12 is inserted from the D1 direction shown in FIGS. 1 and 2).

Then, as shown in FIGS. 1 and 2, the tip of the electric wire 20 is inserted toward the housing body 10 from the D2 direction, and inserted through the electric wire press-fitting holes 12a and 12b of the mat seal 12 and the insertion hole 13a of the mat seal cover 13; thus, the waterproof component 1 according to the present embodiment is produced.

In the present embodiment, since the mat seal 12 is inserted into the mat seal accommodating chamber 200 of the housing body 10 from the circuit load side and held by the bottom wall 170, even when the electric wire 20 is pulled toward the ECU after the waterproof component 1 is attached to the wall portion 30, it is possible to avoid a situation where the mat seal 12 is detached from the housing body 10 by the pulling force.

In addition, in the waterproof component 1 according to the present embodiment, as shown in FIG. 4, the mat seal 12 is fixed in such a manner as to be interposed between the housing body 10 and the mat seal cover 13. Therefore, even when the electric wire 20 is pulled toward the sensor side (S1 side) or the ECU side (S2 side), the mat seal 12 does not come out from the housing body 10, and the waterproof effect can be surely exhibited.

Figure 7A:
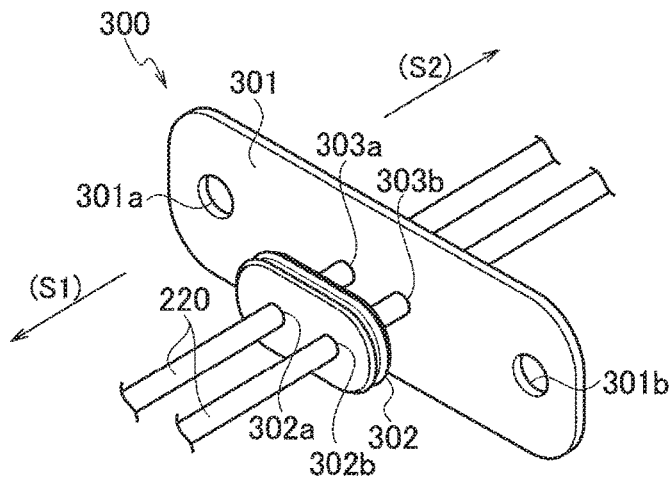
FIG. 7A is a perspective view showing a configuration of a waterproof component according to a comparative example.
Figure 7B:
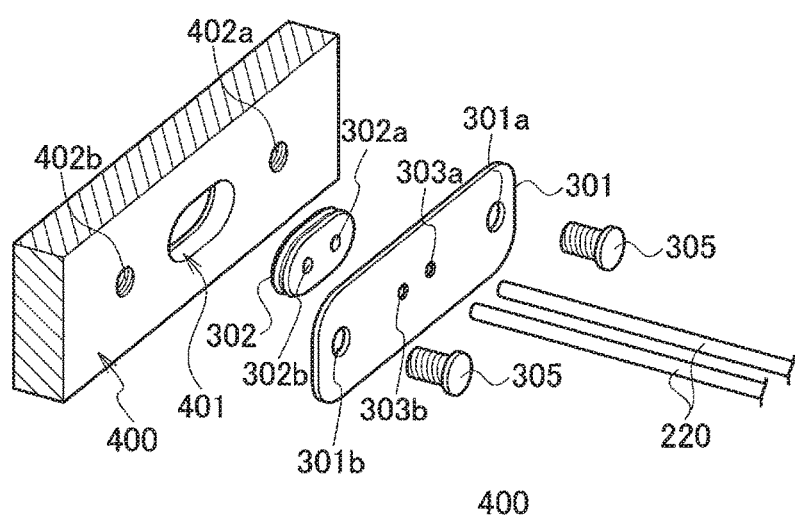
FIG. 7B is a perspective view showing a configuration of a waterproof component according to the comparative example.
Figure 7C:
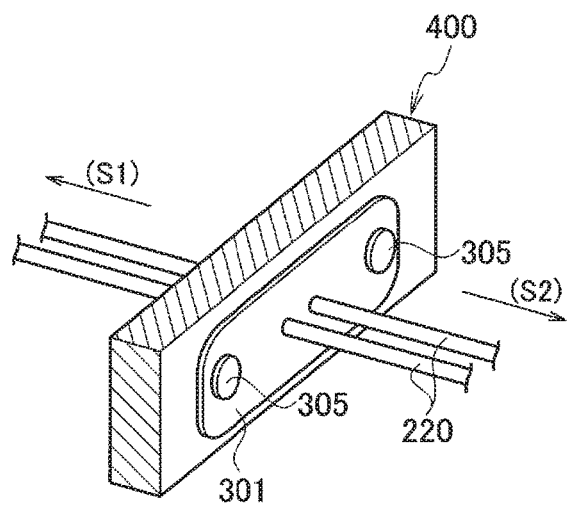
FIG. 7C is a perspective view showing a configuration of a waterproof component according to the comparative example.

By the way, the waterproof component 300 according to the reference example as shown in FIGS. 7A to 7C includes a metal plate member 301 having insertion holes 303a and 303b through which electric wires 220 are passed and screwing holes 301a and 301b, and a rubber-made sealing member 302 having insertion holes 302a and 302b.

As shown in FIG. 7A, the waterproof component 300 has a state in which the electric wires 220 are passed through the plate member 301 and the sealing member 302 from the electronic control unit (ECU) side (S2 side) to the sensor side (S1 side) as the connection destination.

Then, in the waterproof component 300, the sealing member 302 is fitted to the wall portion 400 of the housing of the control device or the like having the fitting hole 401 and the screw holes 402a and 402b, and thereafter the plate member 301 abuts the wall portion to be fixed with screws 305.

Thus, in the waterproof component 300 according to the reference example, a plurality of attaching processes such as a sealing member fitting process and a plate member screwing process are required, and there is a difficulty that this takes much time and effort in the attaching work to be inferior in the working efficiency.

Attaching Process

Next, the attaching process of the waterproof component 1 will be described with reference to FIGS. 6A and 6B.

First, as shown in FIG. 6A, the attachment hole insertion portion 101 side of the waterproof component 1 is caused to face the attachment hole 31 formed in the wall portion 30 of the vehicle body panel or the like. Then, with the tip of the electric wire 20 inserted in the attachment hole 31, the waterproof component 1 is pressed toward the D3 direction.

Thus, the tip of the claw portion 181 of each of the locking claws 101a makes sliding contact with the inner wall of the attachment hole 31, and the elastic support wall 180 elastically deforms inward.

Next, when the claw portion 181 of the locking claw 101a reaches the back surface of the wall portion 30 to be exposed, the elastic support wall 180 returns to the original position by elasticity, and as shown in FIG. 6B, the claw portion 181 is locked to the peripheral surface 35 of the attachment hole 31. In this case, the abutting portion 116 of the waterproof component 1 abuts the peripheral surface 33 of the attachment hole 31 opposite to the surface 35 to which the claw portion 181 in the wall portion 30 is locked.

Thus, the waterproof component 1 is fixed to the wall portion 30 of the vehicle body panel or the like.

As described above, according to the waterproof component 1 according to the present embodiment, the attachment work can be completed by a simple work of simply pressing the waterproof component 1 against the attachment hole 31 to be attached.

In particular, as in the reference example, since the screwing work for fixing the waterproof component is unnecessary, it is possible to reduce the labor and time required for the work to improve the efficiency of the attachment work.

It should be noted that in the attached state as shown in FIG. 6B, in the waterproof component 1, the waterproof effect relating to the electric wire 20 is fulfilled by the close contact between the outer peripheral surface of the electric wire 20 and the electric wire press-fitting hole 12a of the mat seal 12. Then, the waterproof effect between the waterproof component 1 and the wall portion 30 is fulfilled by the close contact between the elastic ring (O ring) 11 and the inner peripheral surface of the wall portion 30.

As described above, although the waterproof component of the present invention is described based on the illustrated embodiment, the present invention is not limited thereto, and the configuration of each part can be replaced with any configuration having the same function.

What is claimed is:

1. A waterproof component configured to insert an electric wire into an attachment hole penetrating a wall portion to lock, the waterproof component comprising:
    a housing body including:
        an attachment hole insertion portion configured to be inserted into the attachment hole, a mat seal accommodating chamber having a bottom wall being formed inside the attachment hole insertion portion;
        an abutting portion configured to abut a first peripheral surface of the attachment hole;
        a locking claw provided in an elastically deformable manner on an insertion tip side of the attachment hole insertion portion, the locking claw being configured to be locked to a second peripheral surface of the attachment hole opposite to the first peripheral surface; and
        a cover locking portion provided on the insertion tip side of the attachment hole insertion portion;
    a mat seal accommodated in the mat seal accommodating chamber, the mat seal having an electric wire press-fitting hole configured to receive an electric wire therein;
    a mat seal cover locked to the cover locking portion, the mat seal cover interposing the mat seal between the mat seal cover and the bottom wall to hold the mat seal in the mat seal accommodating chamber; and
    an elastic ring disposed on an outer periphery of the attachment hole insertion portion, the elastic ring being in contact with an inner peripheral surface of the attachment hole.

2. The waterproof component according to claim 1, wherein
    the wall portion partitions a side on which the electric wire is connected via a connector to a circuit load side and a power side of the electric wire, and
    the mat seal is inserted into the mat seal accommodating chamber of the housing body from the circuit load side.

* * * * *